No. 887,662.
PATENTED MAY 12, 1908.
R. F. LAWSON.
STEAK SHREDDER.
APPLICATION FILED APR. 16, 1907.
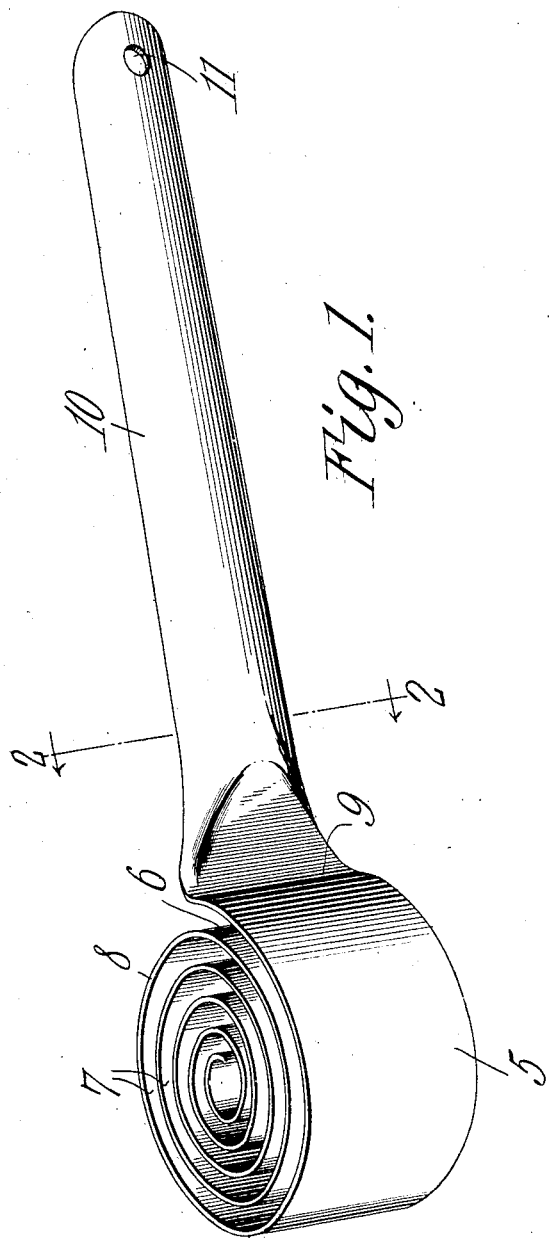
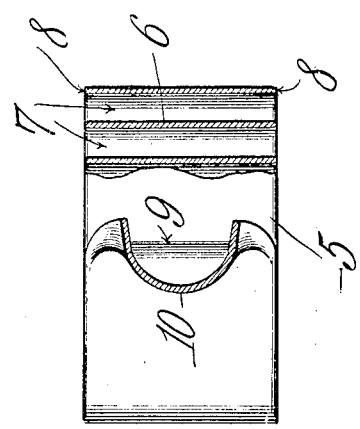
WITNESSES:
Richard F. Lawson,
INVENTOR.
By C. A. Snow & Co.
ATTORNEYS

UNITED STATES PATENT OFFICE.

RICHARD F. LAWSON, OF EFFINGHAM, ILLINOIS.

STEAK-SHREDDER.

No. 887,632.

Specification of Letters Patent.

Patented May 12, 1908.

Application filed April 16, 1907. Serial No. 368,515.

*To all whom it may concern:*

Be it known that I, RICHARD F. LAWSON, a citizen of the United States, residing at Effingham, in the county of Effingham and State of Illinois, have invented a new and useful Steak-Shredder, of which the following is a specification.

This invention relates to meat shredders and has for its object to provide a comparatively simple and inexpensive device of this character by means of which different kinds of meats may be readily cut or shredded so as to render the same tender and palatable.

A further object of the invention is to provide a shredder having a considerable length of cutting surface within a relatively small area so that the meat may be quickly and thoroughly shredded with very little exertion on the part of the operator.

A further object is to provide a shredder having a plurality of spirally disposed convolutions the edges of which form opposite cutting surfaces whereby the implement may be reversed with either cutting surface presented to the work.

A further object is to provide a shredder which will not become clogged or obstructed and which may be readily cleaned when necessary.

A still further object of the invention is to generally improve this class of devices so as to increase their utility, durability and efficiency as well as to reduce the cost of manufacture.

Further objects and advantages will appear in the following description, it being understood that various changes in form, proportions and minor details of construction may be resorted to within the scope of the appended claims.

In the accompanying drawings forming a part of this specification: Figure 1 is a perspective view of a meat shredder constructed in accordance with my invention. Fig. 2 is a transverse sectional view, a portion of the head of the implement being broken away to show the construction and arrangement of the spring convolutions.

Similar numerals of reference indicate corresponding parts in all of the figures of the drawings.

The improved shredding implement forming the subject matter of the present invention includes a body portion 5 formed of a continuous strip of metal, preferably cold rolled steel, one end of which is coiled to form a plurality of spirally disposed convolutions 6 constituting the head of the implement.

The convolutions 6 are spaced apart at 7 so as to prevent the head from becoming clogged or otherwise obstructed, while the edges of said convolutions present oppositely disposed cutting edges 8 adapted to cut or shred the meat or other article of feed operated upon.

One end of the body portion or strip 5 is bent at right angles to the adjacent convolution 6, as indicated at 9 and thence extended laterally to form an operating handle 10, the opposite longitudinal edges of the metal forming the handle 10 being curved laterally so as to prevent the same from cutting, lacerating or otherwise injuring the hand of the operator.

The free end of the handle 10 is preferably formed with a terminal aperture or opening 11 by means of which the implement may be conveniently hung on a nail or other suitable support when not in use.

Attention is here called to the fact that by having the opposite edges of the convolutions smooth and unobstructed the implement may be reversed so that either cutting surface may be presented to the meat. It will also be observed that the several convolutions comprising the head of the implement are spaced apart to form a continuous uninterrupted passage so that a strip of linen cloth or other material may be introduced between the several convolutions when it is desired to clean the same.

When one cutting surface becomes dull or otherwise impaired from constant use the implement may be reversed so that the opposite cutting surfaces of the implement may be presented to the work.

While the shredder is principally designed for cutting or shredding meat it is obvious that the same may be used for cutting noodles, potatoes, vegetables and for various other purposes.

From the foregoing description it will be seen that there is provided an extremely simple, inexpensive and efficient device admirably adapted for the attainment of the ends in view.

Having thus described the invention what is claimed is:

1. An implement of the class described comprising a body portion formed of spaced convolutions provided with oppositely disposed cutting edges arranged in spiral form to produce flat bearing surfaces, one of the convolutions being extended laterally to form an operating handle.

2. An implement of the class described formed of a single piece of metal one end of which is bent to form a plurality of spaced convolutions having oppositely disposed cutting edges arranged parallel with each other, the opposite end of the metal being bent to form an operating handle.

3. An implement of the class described comprising a body portion curved spirally and formed with opposite parallel sharpened edges, one end of the body portion being extended as a handle.

In testimony that I claim the foregoing as my own, I have hereto affixed my signature in the presence of two witnesses.

RICHARD F. LAWSON.

Witnesses:
    FRANK L. TAYLOR,
    E. B. SCHOOLEY.